(12) United States Patent
Michel et al.

(10) Patent No.: US 10,582,383 B2
(45) Date of Patent: Mar. 3, 2020

(54) METHOD OF MANAGING A PROFILE STORED IN A SECURE ELEMENT, AND CORRESPONDING SECURE ELEMENT

(71) Applicant: IDEMIA FRANCE, Colombes (FR)

(72) Inventors: Alexis Michel, Colombes (FR); Tomasz Wozniak, Colombes (FR)

(73) Assignee: IDEMIA FRANCE, Colombes (FR)

( * ) Notice: Subject to any disclaimer, the term of this patent is extended or adjusted under 35 U.S.C. 154(b) by 328 days.

(21) Appl. No.: 15/220,994

(22) Filed: Jul. 27, 2016

(65) Prior Publication Data

US 2017/0034699 A1  Feb. 2, 2017

(30) Foreign Application Priority Data

Jul. 28, 2015 (FR) .................................... 15 57218

(51) Int. Cl.
*H04W 12/06* (2009.01)
*H04L 29/06* (2006.01)
*H04W 8/18* (2009.01)

(52) U.S. Cl.
CPC ............ *H04W 12/06* (2013.01); *H04L 63/20* (2013.01); *H04W 8/183* (2013.01)

(58) Field of Classification Search
None
See application file for complete search history.

(56) References Cited

U.S. PATENT DOCUMENTS

| 9,398,452 B1* | 7/2016 | Upp | H04W 12/04 |
| 2010/0275250 A1* | 10/2010 | Devadoss | G06F 21/31 |
| | | | 726/6 |
| 2015/0281957 A1* | 10/2015 | Hartel | H04M 1/675 |
| | | | 455/411 |
| 2016/0174065 A1* | 6/2016 | Li | H04W 8/205 |
| | | | 455/419 |
| 2017/0156051 A1* | 6/2017 | Park | H04L 67/22 |
| 2018/0123803 A1* | 5/2018 | Park | H04L 9/3263 |

FOREIGN PATENT DOCUMENTS

| DE | 10 2012 018 540 A1 | 3/2014 |
| KR | 10-2013-0048699 A | 5/2013 |

OTHER PUBLICATIONS

French Search Report dated May 4, 2016, French Application No. 1557218, pp. 1-2.
Denis Praca, "ETSI SCP Status and remote provisioning solutions", 3GPP2 Meeting, Retrieved from the internet on Dec. 13, 2011, http://ftp.3gpp2.org/TSGS/Working/_2011/2011-12-HI/WGI Requirements/, pp. 1-30.

* cited by examiner

*Primary Examiner* — Henry Tsang
(74) *Attorney, Agent, or Firm* — MH2 Technology Law Group, LLP

(57) ABSTRACT

Devices and methods for managing a mobile communications profile stored in a nonvolatile memory of a secure element and performed by the secure element are disclosed. The devices and methods may include operations such as reading the state of a flag stored in the nonvolatile memory of the secure element and indicating whether the profile may be deleted; determining the active or inactive state of the profile; and if the flag indicates that the profile may be deleted and if it is determined that the profile is inactive, then deleting the profile.

12 Claims, 2 Drawing Sheets

METHOD OF MANAGING A PROFILE STORED IN A SECURE ELEMENT, AND CORRESPONDING SECURE ELEMENT

CROSS-REFERENCE TO RELATED APPLICATIONS

This application claims priority to French Application No. 1557218 filed 28 Jul. 2015, the entire disclosure of which is hereby incorporated by reference in its entirety.

BACKGROUND OF THE INVENTION

The invention relates to the general field of secure elements in which profiles can be stored, and in particular to the secure elements that are installed in terminals.

The invention applies in particular and in nonlimiting manner to secure elements of the embedded universal integrated circuit card (eUICC) type that are embedded in terminals.

Secure elements of the eUICC type are described in the GSMA—SGP.02 standard "Remote Provisioning Architecture for Embedded UICC Technical Specification"—Version 2.0. It may be observed that these elements can be used to replace a traditional subscriber identity module (SIM) card with a microcircuit that is installed in permanent manner in a terminal. Specifically, the functions of authentication with a mobile network operator (MNO) are performed in analogous manner by an eUICC and by a SIM card. eUICC elements differ from traditional UICC elements in that they include profiles making authentication possible with different mobile network operators. By way of indication, a device fitted with a secure element of this type may be sold with a so-called "provisioning" profile already stored in the secure element. The provisioning profile makes it possible subsequently to select a mobile network operator and to download a new profile corresponding to that mobile network operator. The downloading takes place from a security domain server known as a "Subscription Manager-Secure Routing" (SM-SR) server. eUICC elements are thus particularly suitable for communication between electronic devices in so-called "Machine to Machine" (M2M) communication in which it may be preferable for the secure element to be secured permanently, e.g. by soldering.

The infrastructures needed for managing profiles in eUICC elements comprise at least one mobile network operator, a "Subscription manager-Data Preparation" (SM-DP) server that encrypts the profiles downloaded by the eUICC element, an SM-SR security domain server, and finally the eUICC element itself.

In the present application, the concept of a "profile" should be interpreted broadly, i.e. as a data set comprising at least one file and/or data. A profile in the meaning of the invention may in particular comprise at least one element selected from:
- a standard file as defined by the 3GPP or ETSI specifications for UICCs and their applications, and in particular by the standards 3GPP 31.102 and ETSI 102.221;
- a proprietary file;
- a configuration file of an operating system;
- a Java Card application and associated personalization elements;
- data such as transport protocol keys, authentication algorithm parameters, . . . .

Specifically, an eUICC element includes a privileged security domain known as the Issuer Security Domain Root (ISD-P) configured to manage profiles and one or more security domains each known as an Issuer Security Domain-Profile (ISD-P) and each having a profile.

A security domain thus includes at least the same data as a profile (data and/or application), and it may be observed that a privileged security domain also includes encryption keys and applications. In the present application, by abuse of language, the term "privileged security domain" is used both for the memory zone that includes those keys and applications, and also for the software module that has functions of managing the security domain and that is obtained from the privileged security domain.

It has been observed that the provisioning profile is no longer used once a profile has been downloaded and has been activated, since its main function is to enable a profile to be downloaded.

Other profiles that are downloaded subsequently may also be for temporary use only. This applies to profiles that are limited to a duration (e.g. a limited consumption time), to a period (profile valid during a limited period), or indeed associated with limits on data transfer (data quota). Nevertheless, these profiles are all conserved by the eUICC secure element.

Also, each profile is associated with a pair of data items that are well known to the person skilled in the art namely the international mobile subscriber identity (IMSI) and the encryption key (Ki) Mobile network operators have only a limited number of IMSI/Ki pairs available to them.

Each unused profile that is stored in an eUICC element thus corresponds to an IMSI/Ki pair that is unused. That is disadvantageous for mobile network operators, who would like to be able to reuse IMSI/Ki pairs.

Storing unused profiles is also problematic given the quantity of memory that is occupied in an eUICC secure element by the unused profiles.

Such storage also raises problems of security since secret data belonging to mobile network operators is stored with the profiles.

Finally, if a large number of profiles are stored in an eUICC secure element, manual management of the profiles can become confused. Such confusion may appear if a user makes use of an interface in order to select one profile for activation from among all of the profiles stored in the secure element.

The invention seeks in particular to mitigate some of those drawbacks, and in particular to improve the processing of unused profiles stored in secure elements.

OBJECT AND SUMMARY OF THE INVENTION

The present invention satisfies this need by proposing a method of managing a mobile communications profile stored in a nonvolatile memory of a secure element and performed by said secure element, the method being characterized in that it includes:
reading the state of a flag stored in said nonvolatile memory of the secure element and indicating whether said profile may be deleted;
determining the active or inactive state of said profile; and
if said flag indicates that the profile may be deleted and if it is determined that the profile is inactive, deleting said profile.

The method thus makes it possible to authorize deletion of a profile at the initiative of the secure element, which verifies the following two conditions are true: the flag indicates that the profile may be deleted, and the profile is inactive.

By deleting this active profile, if the profile is associated with an IMSI/Ki pair, it becomes possible to recover that pair for another secure element. It is also possible to release memory space and to clarify the management of numerous profiles by a user.

Also, security problems associated with storing secret information in profiles are resolved.

It may be observed that in prior art solutions for eUICC elements, a profile is deleted only after receiving a deletion instruction issued by an SM-SR security domain server: there is no reading of a flag indicating whether the profile may be deleted since the flag is not present in prior art secure elements. In this example, the flag is stored in the nonvolatile memory of the secure element, and it is always present and readable so long as the profile has not been deleted.

The nonvolatile memory may be electrically erasable programmable read-only memory (EEPROM), or it may be a flash memory.

It is also possible to observe that in prior art solutions, profiles are managed by a security domain server that can perform deletions only if the secure element is connected to a network for mobile communication. In contrast, in the invention, even if the connection to the network is interrupted, it is still possible for the secure element to verify that the conditions needed for deleting a profile are such that it is possible to delete the profile. This makes it possible to avoid conserving useless profiles even if there is an interruption in the connection to the network.

Deletion is thus performed automatically by the secure element that need not be connected to the mobile communications network. Deletion is thus initiated without receiving a message coming from the outside, and in particular from a security domain server, e.g. a "delete" type message.

In a particular implementation, the method includes a prior allocation step of allocating a state to said flag indicating that the profile may be deleted, said allocation being performed during a personalization stage of the secure element that includes storing said profile.

The personalization stage is a stage is well known to the person skilled in the art in which a secure element is configured by storing data specific to the secure element in its nonvolatile memory, and in particular a mobile communications profile.

This particular implementation makes it possible to delete a profile automatically as soon as it is deactivated, since when storing or initializing the profile (during the personalization stage), the flag is put into a state that indicates that the profile may be deleted. This particular implementation is particularly well suited to temporary profiles that need to be conserved only until they have been replaced.

In a particular implementation, said personalization stage is performed prior to a stage of using the secure element, and the personalization stage comprises making a connection to a reader that powers the secure element electrically, authenticating and/or making cryptographically secure a session with the reader, said storing of the profile and said allocating of a state to said flag indicating that the profile may be deleted during the session, closing said session, and disconnecting the card from the reader.

The stage of using the secure element comprises use of the secure element by a final user after the profile has been allocated to the final user and after the secure element has been returned to a user (e.g. in a terminal).

In a particular implementation, said personalization stage is performed during a stage of using the secure element, and the personalization stage comprises authenticating and/or making cryptographically secure a session on a mobile communications channel, said storing of the profile during the session and said allocating of a state to said flag indicating that the profile may be deleted, and closing said session.

In this example, the personalization stage is performed remotely (i.e. "over the air").

In a particular implementation, the mobile communications profile is a provisioning profile.

This particular implementation enables the provisioning profile to be deleted automatically as soon as a new profile has been downloaded and activated.

In a particular implementation, the method includes a prior step of said secure element comparing an operating variable associated at least with said profile to a threshold associated at least with said profile, said threshold and said operating variable being stored in said nonvolatile memory of the secure element, and if said threshold is reached by said operating variable, allocating a state to said flag indicating that the profile may be deleted.

In this particular implementation, a state indicating that the profile may be deleted is allocated to the flag after the profile has been stored, and this allocation takes place after the profile and the secure element have already been used. Also, comparison and allocation are performed at the initiative of the secure element since the operating variable is specific to the secure element, and can be measured or read by the secure element. In other words, comparison and allocation are performed without receiving a message from the outside for the purpose of causing allocation to take place.

Also, the operating variable associated with the secure element may be an operating variable of a terminal in which the secure element is embedded and with which it is thus associated.

In a particular implementation, said variable is a duration for operating in communication and said threshold is a maximum duration for operating in communication, or said variable is a quantity of data and said threshold is a maximum quantity of data, or said operating variable is an activation duration for the profile and said threshold is a maximum duration for activation of the profile.

This particular implementation applies specifically to mobile communications profiles that are limited concerning call duration or a quantity of data that can be exchanged with the outside, or indeed a duration during which the profile is activated. These variables may be tracked by the secure element that is used during communications with the outside.

In a particular implementation, said profile is stored in a security domain further including said flag, and deleting said profile includes deleting the security domain including said profile.

In a particular implementation, said reading of the state of the flag, said determining of the state of the profile, and said deletion are performed by using a privileged security domain, e.g. of ISD-R type.

In a particular implementation, said secure element is an eUICC element in compliance with the GSMA—SGP.02 standard "Remote Provisioning Architecture for Embedded UICC Technical Specification"—Version 2.0.

The invention also proposes a computer program including instructions for executing steps of a method as defined above when said program is executed by a processor.

The invention also provides a data medium that is readable by a processor and that stores a computer program including instructions for executing steps of a method as defined above.

It may be observed that the computer programs mentioned in the present description may use any programming language, and may be in the form of source code, object code, or code intermediate between source code and object code, such as in a partially compiled form, or in any other desirable form.

Furthermore, the data media mentioned in the present description may be any entity or device capable of storing the program. For example, the medium may comprise storage means, such as a read-only memory (ROM), for example a compact disk (CD) ROM, or a microelectronic circuit such as an EEPROM, or indeed magnetic recording means, e.g. a floppy disk or a hard disk.

Furthermore, the data media may correspond to a transmissible medium such as an electrical or optical signal that can be conveyed via an electrical or optical cable, by radio, or by other means. The program of the invention may in particular be downloaded from a network of the Internet type.

Alternatively, the data media may correspond to an integrated circuit in which the program is incorporated, the circuit being adapted to execute or to be used in the execution of the method in question.

The invention also provides a secure element comprising a nonvolatile memory storing a mobile communications profile, characterized in that a flag indicating whether said profile may be deleted is stored in said nonvolatile memory of the secure element, and said secure element includes a read module for reading said flag, a determination module for determining the active or inactive state of said profile, and a module for deleting said profile if said read module indicates that the profile may be deleted and if said determination module indicates that the profile is inactive.

The secure element may be configured to perform each of the implementations of the method as defined above.

The invention also provides a terminal including said secure element.

BRIEF DESCRIPTION OF THE DRAWINGS

Other characteristics and advantages of the present invention appear from the following description made with reference to the accompanying drawings, which show an implementation having no limiting character.

In the figures.

DETAILED DESCRIPTION OF AN IMPLEMENTATION

There follows a description of an implementation of the invention relating to a method of managing a mobile communications profile stored in a nonvolatile memory of a secure element, which method is performed by the secure element. In this example, the secure element is of the eUICC type.

It should be observed that the invention applies to any secure element, including secure elements other than eUICC elements, but that likewise enable profiles to be stored in secure manner.

Figure 1:
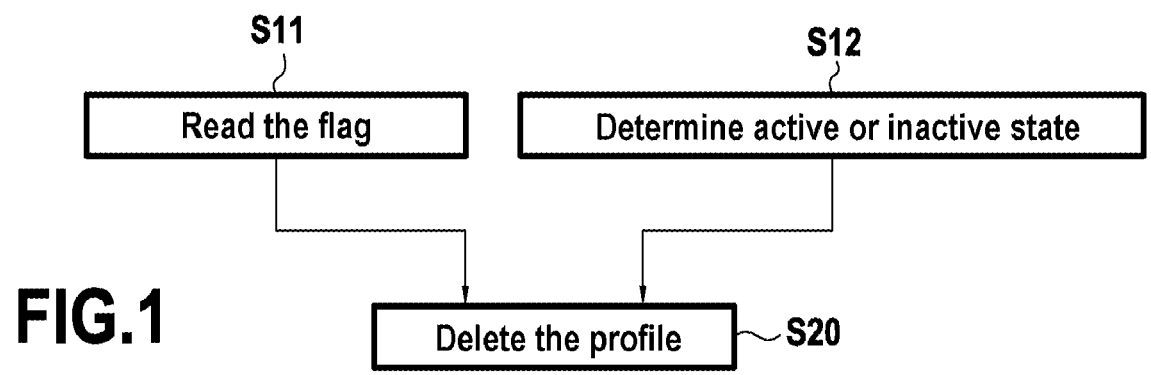
FIG. 1 shows diagrammatically the various steps of a method in an implementation of the invention.

FIG. 1 is a diagram showing the steps of a method of managing a profile stored in a secure element of the eUICC type. The method may be performed at any time while the secure element is in operation.

The method comprises reading S11 a flag stored in a nonvolatile memory of the secure element, and more precisely with said profile. This flag presents two states, one state indicating that the profile may be deleted (state "1"), and another state indicating that the profile may not be deleted (state "0").

A flag indicating that the profile may be deleted relates to it being deleted without receiving a "delete" type message coming from a security domain server. Also, it will readily be understood that a flag indicating that the profile may not be deleted does not prevent the profile being deleted by the prior art technique based on a "delete" type message received from the outside, and in particular a "delete" type message sent by a security domain server.

The method also includes a step S12 in which it is determined whether the profile is active or inactive.

This may be done by means of a privileged security domain of the ISD-R type that uses commands ("enable/disable") to manage the activity of a profile and that therefore has information relating to whether the profile is active or inactive.

If said flag indicates that the profile may be deleted and if it is determined that the profile is inactive, then the profile is deleted (step S20). This deletion is performed by the privileged security domain ISD-R ("delete" command).

Figure 2:
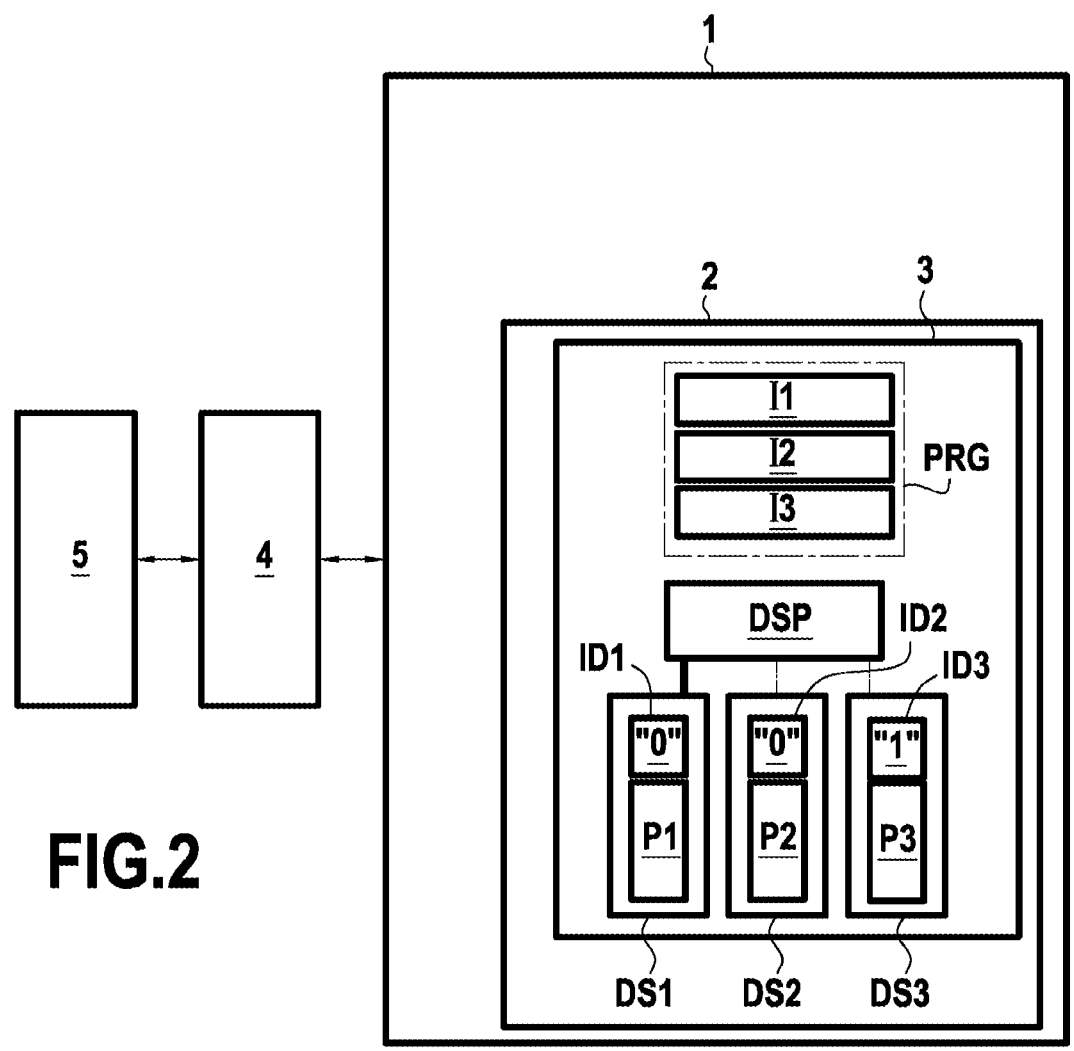
FIG. 2 shows diagrammatically a terminal fitted with a secure element in an embodiment of the invention.

FIG. 2 is a diagram showing a terminal 1 fitted with a secure element 2 in an embodiment of the invention. The secure element 2 can perform the method described with reference to FIG. 1.

The secure element 2 has a nonvolatile memory 3 storing a computer program PRG that includes instructions for executing steps of the method described with reference to FIG. 1.

More precisely, the program PRG includes an instruction I1 for reading the flag of a profile in order to perform step S11, an instruction I2 for determining the activity of a profile in order to perform step S12, and a deletion instruction I3 in order to perform the step S20.

A plurality of mobile communications profiles are stored in the memory 3. More precisely, in this example, the memory 3 contains three security domains: a first security domain DS1 containing a first profile P1; a second security domain DS2 containing a second profile P2; and a third security domain DS3 containing a third profile P3. The first security domain DS1, the second security domain DS2, and the third security domain DS3 are of the ISD-P type.

In the example shown in the figure, only the first profile P1 is active, and this is represented in the figure by a bold line connecting the first security domain DS1 to a privileged security domain DSP of the ISD-R type. The second profile P2 and the third profile P3 are inactive and this is represented in the figure by discontinuous lines connecting the second security domain DS2 to the privileged security domain DSP and the third security domain DS3 to the privileged security domain DSP.

In each security domain DS1, DS2, or DS3, a flag (given reference ID1, ID2, ID3 in the figure) is stored in order to have a value "0" or "1". The "1" state of this flag indicates that the profile associated with the flag (i.e. stored in the same security domain) may be deleted. The "0" state of this flag indicates that the profile associated with the flag (i.e. stored in the same security domain) may not be deleted.

FIG. 2 also shows diagrammatically the context in which the invention is performed. In this example, the terminal 1 and its secure element 2 are in communication with a security domain server 4 of SM-SR/SM-DP type, and the security domain server 4 is itself in communication with a mobile network operator 5.

In this example, the first profile P1 is the profile associated with this mobile network operator 5. This first profile P1, which is active, is a profile that may not be deleted, since the flag ID1 that is associated therewith is set at "0".

The second profile P2, which is not active, is likewise a profile that may not be deleted since the flag ID2 that is associated therewith is set at "0".

This does not apply to the third profile P3, which is not active and which may be deleted since the flag ID3 with which it is associated is set at "1". As a result, the method of the invention may be performed by executing the instructions I1 to I3 leading to the third profile P3 being deleted, with the entire third security domain DS3 being deleted.

It should be observed that the terms "deletable" and "not deletable" as used in the paragraphs above should be understood herein as referring to deletion in the meaning of the invention in which both conditions are satisfied (flag and activity). It will readily be understood that deletion using the prior art technique as ordered by a mobile network operator or a security domain server continues to be possible for any profile.

A deletable profile is a profile that can be deleted by the secure element without receiving a "delete" type message coming from a security domain server. Also, it should readily be understood that a non-deletable profile can nevertheless be deleted by the prior art technique based on a message received from the outside, and in particular a "delete" type message sent by a security domain server.

Figure 3:
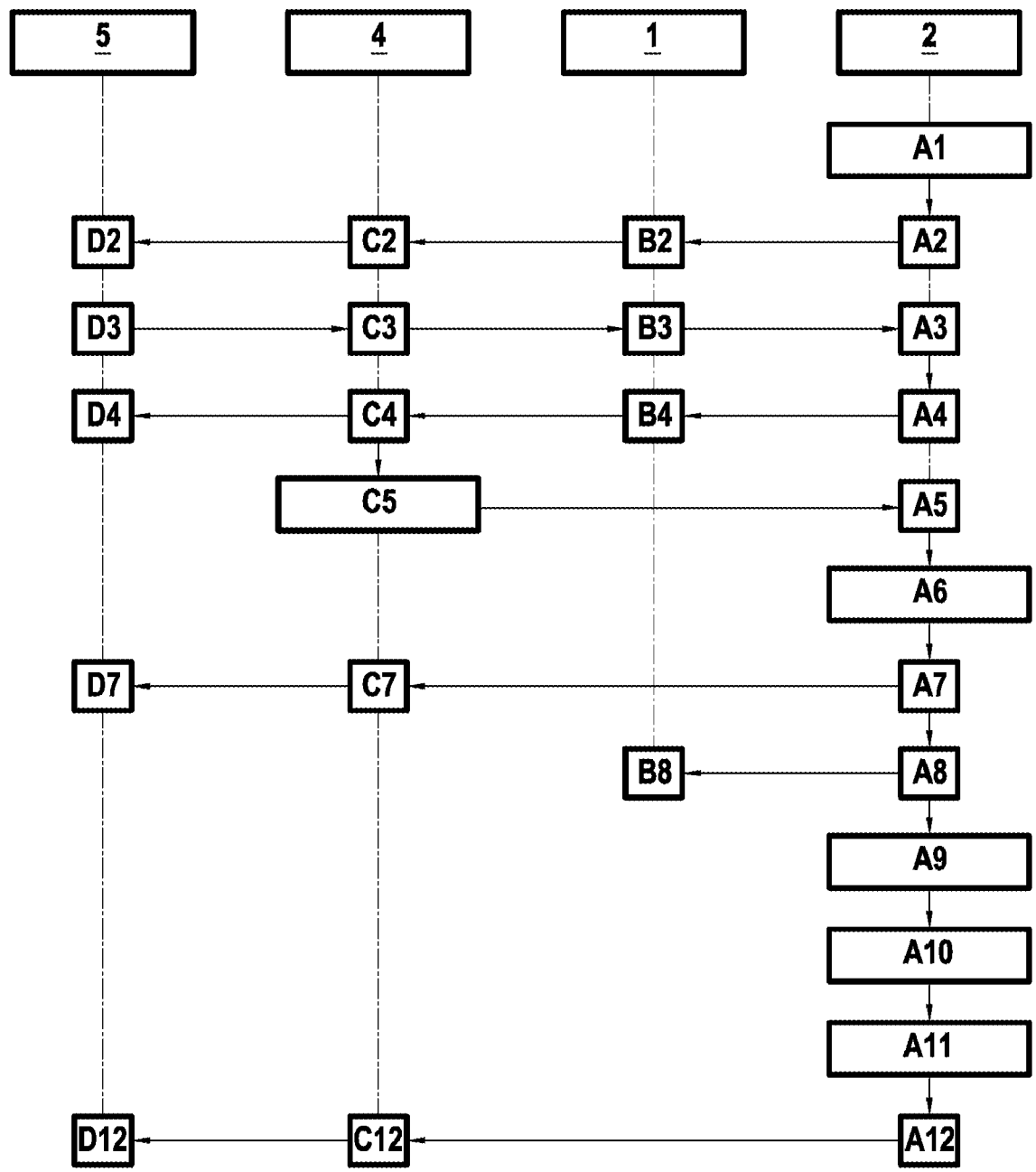
FIG. 3 shows an example of an implementation of the invention.

FIG. 3 shows an example of performing a profile management method that can be implemented with a secure element as described with reference to FIG. 2.

In this figure, there can be seen the various steps of this method together with the elements associated with each of these steps: the secure element 2; the terminal 1; the security domain server 4; and finally the mobile network operator 5.

Also, the example shown in this figure corresponds to managing a provisioning profile, specifically an initial provisioning profile stored during fabrication and configuration of the secure element.

In a first step A1, a provisioning profile is stored together with a flag in a security domain of a memory of the secure element 2. During this step A1, the flag is set to the "1" state: this provisioning profile may be deleted, and it will be if the profile is deactivated and another profile is activated. At this stage, this profile is the only profile available and it is active.

During a subsequent step A2, the provisioning profile is used to inform the terminal 1 that another profile associated with the network operator 5 is being requested.

It may be observed that the state "1" is given to said flag during the step A1, which necessarily takes place before the beginning of step A2.

In a step B2 the terminal receives the request for the other profile and it transmits this request to the security domain server 4. This request is received and then forwarded to the mobile network operator 5 (step C2). The mobile network operator receives this request in step D2.

During a step D3, the mobile network operator forwards data including the requested other profile to the security domain server 4. This data is forwarded (step C3) by the security domain server to the terminal 1, which in turn forwards it (step B3) to the secure element 2, which stores it during a step A3.

Thereafter, the security element issues (step A4) confirmation for the mobile network operator indicating that the data has been stored, and this confirmation is forwarded by the terminal (step B4) and by the security domain server (step C4), so as to be received by the mobile network operator (step D4).

Thereafter, the security domain server triggers activation of the stored profile during a step C5, and in a step A5, the secure element receives this activation instruction.

The profile that has just been stored is activated by the privileged security domain of the secure element during a step A6, with this step including deactivating the provisioning profile.

During a step A7, the secure element sends information to the effect that the provisioning profile has been deactivated and that the other profile has been activated. The security server receives this information in a step C7 and forwards it to the mobile network operator, which receives it in a step D7.

The secure element can then send a refresh command to the terminal (step A8). In a step B8, the terminal processes this refresh command and can make a connection with the mobile network operator 5.

The following steps A9, A10, and A11 are analogous to the steps S11, S12, and S20 described with reference to FIG. 1. The steps comprise reading the flag of the provisioning profile (step A9), determining the inactive state of the provisioning profile (step A10), and finally deleting the provisioning profile (step A11).

Step A12, the secure element sends confirmation of the deletion of the provisioning profile to the security domain server, which receives the confirmation and forwards it (step C12) to the mobile network operator (step D12).

The mobile network operator can then reuse some of the information associated with the profile, and in particular the data pair IMSI/Ki.

The invention is not limited in any way to deleting a provisioning profile. It is equally possible to store profiles with a corresponding flag having a state indicating that the profile may not be deleted, and to change the state of the flag subsequently in order to indicate that the profile is deletable.

Such a change of state may be performed at the initiative of the secure element, and this may involve comparing an operating variable associated with the secure element and a threshold stored in the nonvolatile memory of the secure element. If the threshold is reached by said operating variable, then said flag is given a state indicating that the profile may be deleted.

The variable may be a duration for operating in communication and said threshold may be a maximum duration for operating in communication (e.g. a few hours); or said variable may be a quantity of data and said threshold may be a maximum quantity of data (e.g. a few gigabytes of data); or said operating variable may be an activation duration for the profile and said threshold may be a maximum duration for activation of the profile (e.g. a few days).

The invention claimed is:

1. A method of managing a profile for mobile communications that is stored in a nonvolatile memory of a secure element and performed by the secure element, the method comprising:
   reading the state of a flag stored in the nonvolatile memory of the secure element and indicating whether the profile may be deleted;
   determining the active or inactive state of the profile by accessing the secure element via a privileged security domain of the secure element, wherein the secure element comprises information identifying whether the profile is active or inactive based on activity of the profile managed by the secure element; and if the flag indicates that the profile may be deleted and if it is determined that the profile is inactive, deleting the profile to reduce storage consumption on the nonvolatile memory, wherein the profile is stored in the security domain that includes the flag, and deleting the profile includes deleting the security domain that includes the profile.

2. The method according to claim 1, further comprising:
allocating a state to the flag indicating that the profile may be deleted, the allocation being performed during a personalization stage of the secure element that includes storing the profile.

3. The method according to claim 2, wherein the personalization stage is performed prior to a stage of using the secure element, and the personalization stage comprises:

making a connection to a reader that powers the secure element electrically;

authenticating and/or making cryptographically secure a session with the reader;

the storing of the profile, wherein the allocating of the state to the flag indicates that the profile may be deleted during the session;

closing the session; and disconnecting the card from the reader.

4. The method according to claim 2, wherein the personalization stage is performed during a stage of using the secure element, and the personalization stage comprises:

authenticating and/or making cryptographically secure a session on a mobile communications channel;

the storing of the profile during the session, wherein the allocating of the state to the flag indicates that the profile may be deleted; and closing the session.

5. The method according to claim 2, wherein the profile is a provisioning profile.

6. The method according to claim 1, further comprising:
comparing, by the secure element, an operating variable associated at least with the profile to a threshold associated at least with the profile, the threshold and the operating variable being stored in the nonvolatile memory of the secure element, and if the threshold is reached by the operating variable, allocating a state to the flag indicating that the profile may be deleted.

7. The method according to claim 6, wherein the operating variable is a duration for operating in communication and the threshold is a maximum duration for operating in communication, or the operating variable is a quantity of data and the threshold is a maximum quantity of data, or the operating variable is an activation duration for the profile and the threshold is a maximum duration for activation of the profile.

8. The method according to claim 1, wherein the reading of the state of the flag, the determining of the state of the profile, and the deleting are performed by using a privileged security domain.

9. The method according to claim 1, wherein the secure element is an eUICC element in compliance with the GSMA—SGP.02 standard "Remote Provisioning Architecture for Embedded UICC Technical Specification"—Version 2.0.

10. A non-transitory data medium that is readable by a processor and that stores a computer program including instructions that when executed by the processor perform operations comprising:

reading the state of a flag stored in a nonvolatile memory of a secure element and indicating whether a profile for mobile communications may be deleted;

determining the active or inactive state of the profile by accessing the secure element via a privileged security domain of the secure element, wherein the secure element comprises information identifying whether the profile is active or inactive based on activity of the profile managed by the secure element; and if the flag indicates that the profile may be deleted and if it is determined that the profile is inactive, deleting the profile to reduce storage consumption on the nonvolatile memory, wherein the profile is stored in the security domain that includes the flag, and deleting the profile includes deleting the security domain that includes the profile.

11. A secure element comprising:

a nonvolatile memory storing a profile for mobile communications, wherein a flag indicating whether the profile may be deleted is stored in the nonvolatile memory of the secure element;

a read module for reading the flag;

a determination module for determining the active or inactive state of the profile by accessing the secure element via a privileged security domain of the secure element, wherein the secure element comprises information identifying whether the profile is active or inactive based on activity of the profile managed by the secure element; and a module for deleting the profile to reduce storage consumption on the nonvolatile memory if the read module indicates that the profile may be deleted and if the determination module indicates that the profile is inactive, wherein the profile is stored in a security domain that includes the flag, and deleting the profile includes deleting the security domain that includes the profile.

12. A terminal including the secure element according to claim 11.

* * * * *